(12) United States Patent
Cameron et al.

(10) Patent No.: US 12,327,454 B2
(45) Date of Patent: Jun. 10, 2025

(54) SYSTEM AND METHOD OF AUTOMATED LOGISTICAL VEHICLE REGISTRATION AND VALIDATION FOR REMOTE MONITORING

(71) Applicant: Xtract One Technologies Inc., Toronto (CA)

(72) Inventors: James Allan Douglas Cameron, Fredericton (CA); Matthew Aaron Rogers Carle, Fredericton (CA); Phil Konrad Munz, Saint John (CA); Shawn Mitchell, Saint John (CA); Jonathan Taylor Millar, Fredericton (CA)

(73) Assignee: XTRACT ONE TECHNOLOGIES INC.

( * ) Notice: Subject to any disclaimer, the term of this patent is extended or adjusted under 35 U.S.C. 154(b) by 313 days.

(21) Appl. No.: 17/961,535

(22) Filed: Oct. 6, 2022

(65) Prior Publication Data

US 2023/0109609 A1    Apr. 6, 2023

Related U.S. Application Data

(60) Provisional application No. 63/252,642, filed on Oct. 6, 2021.

(51) Int. Cl.
| | |
|---|---|
| *G07C 9/22* | (2020.01) |
| *G06V 10/70* | (2022.01) |
| *G06V 20/54* | (2022.01) |
| *G06V 20/62* | (2022.01) |
| *G07C 9/10* | (2020.01) |
| *G07C 9/27* | (2020.01) |

(52) U.S. Cl.
CPC ............ *G07C 9/22* (2020.01); *G06V 10/70* (2022.01); *G06V 20/54* (2022.01); *G06V 20/625* (2022.01); *G07C 9/10* (2020.01); *G07C 9/27* (2020.01); *G06V 2201/08* (2022.01)

(58) Field of Classification Search
CPC ... G07C 9/22; G07C 9/10; G07C 9/27; G06V 10/70; G06V 20/54
See application file for complete search history.

(56) References Cited

U.S. PATENT DOCUMENTS

| | | | |
|---|---|---|---|
| 2018/0061155 A1* | 3/2018 | Ghorpade | G07C 9/00571 |
| 2019/0118825 A1* | 4/2019 | Madrigal | G06Q 10/063 |
| 2020/0349496 A1* | 11/2020 | Irwin | G06Q 10/083 |
| 2021/0258719 A1* | 8/2021 | Bosworth | H04W 4/44 |

* cited by examiner

*Primary Examiner* — Nabil H Syed

(57) ABSTRACT

A system and method of automated logistical vehicle registration and validation for remote monitoring. Cameras are deployed at the gate to a trucking logistics facility to record detailed information (e.g., license plate, identification info) on vehicles. Alternatively, vehicle and drive identification credentials can be provided by a mobile application from the driver. The cameras are connected to a data center hosting the automated logistical vehicle registration and validation system. Cameras are placed around the entry gate of a facility that takes snapshots of vehicles "checking in". The system takes this info with assistance from artificial algorithms to read data and images (e.g., photos) to compare and verify the info. Recommendations are then sent to a guard to approve entry of the vehicle.

13 Claims, 13 Drawing Sheets

SYSTEM AND METHOD OF AUTOMATED LOGISTICAL VEHICLE REGISTRATION AND VALIDATION FOR REMOTE MONITORING

CROSS REFERENCE TO RELATED APPLICATIONS

The application claims priority to and the benefit of U.S. Provisional Patent Application Ser. No. 63/252,642, entitled "SYSTEM AND METHOD OF AUTOMATED LOGISTICAL VEHICLE REGISTRATION AND VALIDATION FOR REMOTE MONITORING", filed on Oct. 6, 2021, the disclosure of which is incorporated herein by reference in its entirety.

BACKGROUND

The embodiments described herein relate to security and surveillance, in particular technologies related to threat detection via electronic means.

Manned gates at trucking logistics facilities require always having a guard at the gate (e.g., 24 hours per day, 7 days per week) whether there is one truck showing up or 100 trucks. Manning gates may employ security guards physically onsite to manually verify data (e.g., check numbers, license, weights, etc.) and open and close the gate. Manning gates are expensive to maintain and employing security guards may incur additional costs.

There is a desire to pursue cheaper alternative solutions for remote guard monitoring, including monitoring of multiple locations to save on costs.

SUMMARY

A system and method of automated logistical vehicle registration and validation for remote monitoring. Cameras are deployed at the gate to a trucking logistics facility to record detailed information (e.g., license plate, identification info) on vehicles. Alternatively, vehicle and drive identification credentials can be provided by a mobile application from the driver. The cameras are connected to a data center hosting the automated logistical vehicle registration and validation system. Cameras are placed around the entry gate of a facility that takes snapshots of vehicles "checking in". The system takes this info with assistance from artificial algorithms to read data and images (e.g., photos) to compare and verify the info. Recommendations are then sent to a guard to approve entry of the vehicle.

DETAILED DESCRIPTION

Disclosed herein is an automated logistical vehicle registration and validation system for remote monitoring. Cameras are deployed at the gate to a trucking logistics facility. These cameras are set up to record detailed information on the truck like license plate and other identifying information. These cameras connect to a data center hosting the automated logistical vehicle registration and validation system. Additionally, the trucker wanting to check into the facility (parked in front of the gate) has a mobile app downloaded to their phone where they can scan their documents and driver's license. The cameras placed around the gate then take snapshots of the truck "checking in". The system then takes this information and uses AI algorithms to read both the document and photos for verifying information and compares them. This data is then presented with recommendations to a remote guard (in a call center like situation) to either approve or reject the truck (i.e., open the gate or reject).

In a further embodiment, automated cherry picking and verification of certain data using artificial intelligence (AI) is deployed. Presenting relevant data to the remote guard so they can make quick and informed decisions.

Figure 1:
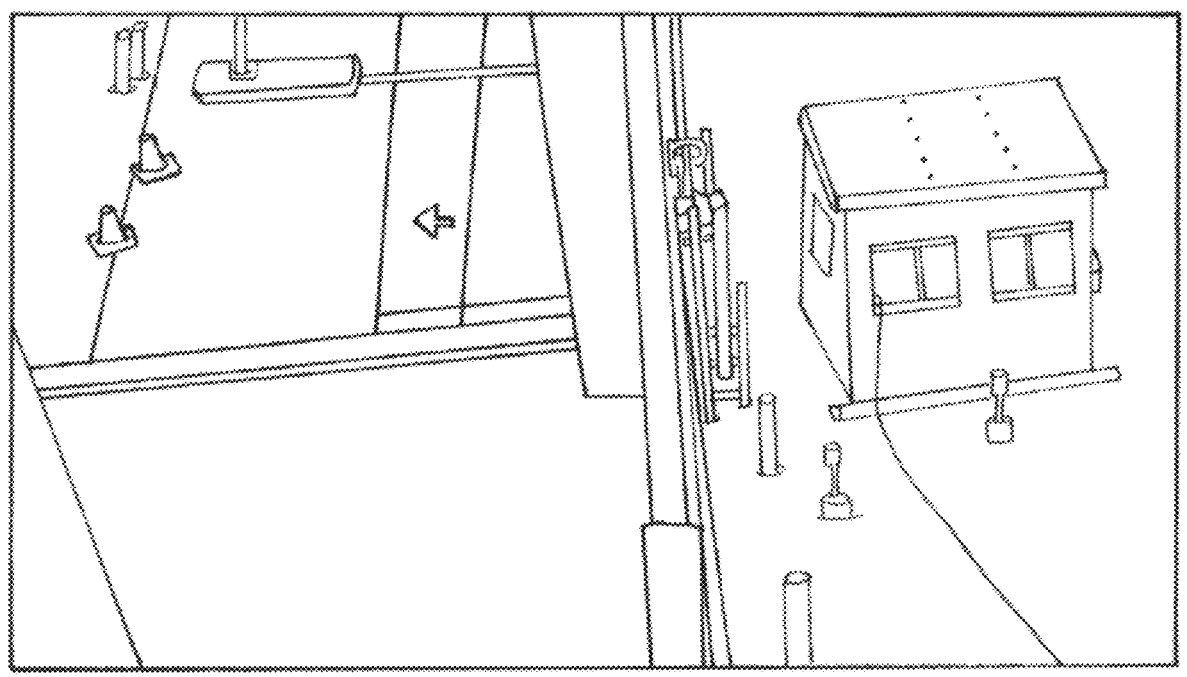
FIG. 1 is a photo illustrating a typical manned gateway.

FIG. 1 is a photo illustrating a typical manned gateway. According to FIG. 1, a shelter (or gateway) is shown where security guards are placed. They will screen every truck that passes by to allow entry/exit of the facility.

Figure 2:
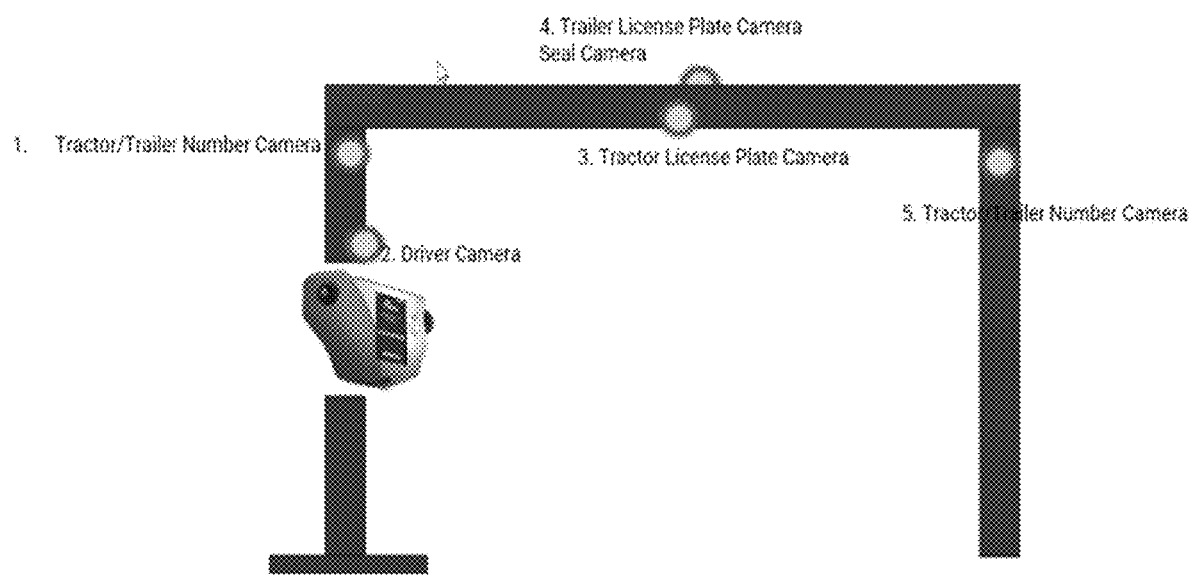
FIG. 2 is a diagram illustrating an exemplary logistics remote gateway solution.

FIG. 2 is a diagram illustrating an exemplary logistics remote gateway solution. According to FIG. 2, an exemplary truck entry gateway is shown. Configured on the truck gateway are a plurality of sensors and cameras, including:
1. Tractor/trailer number camera
2. Driver camera
3. Tractor license plate camera
4. Tractor license plate camera seal camera
5. Tractor/trailer number camera Some benefits of the remote gateway solution in FIG. 1 includes the following:
Reduce the need for on-site 24/7 guards (~$205k/year)→cost savings and automation
Reduce driver interaction as much as possible→integration into XPO Logistics system
Monitor driver activity during trailer drop off/pick up
Allow DOL (landing bill) scanning/picture, driver identification and drop of for DOL papers
Trailer, truck, and seal numbers need to be integrated into their XPO proprietary tracking system
Don't have a development partner for the Department of Transportation (DOT) number detection on truck and trailers According to FIG. 1, the driver camera may be a Wally system that allows the remote gateway solution (including security guards) to remotely interact with the truck driver using voice, video, and display information. Most truck drivers have mobile phones and/or smart phones so it is possible to contact them on their phones.

Figure 3:
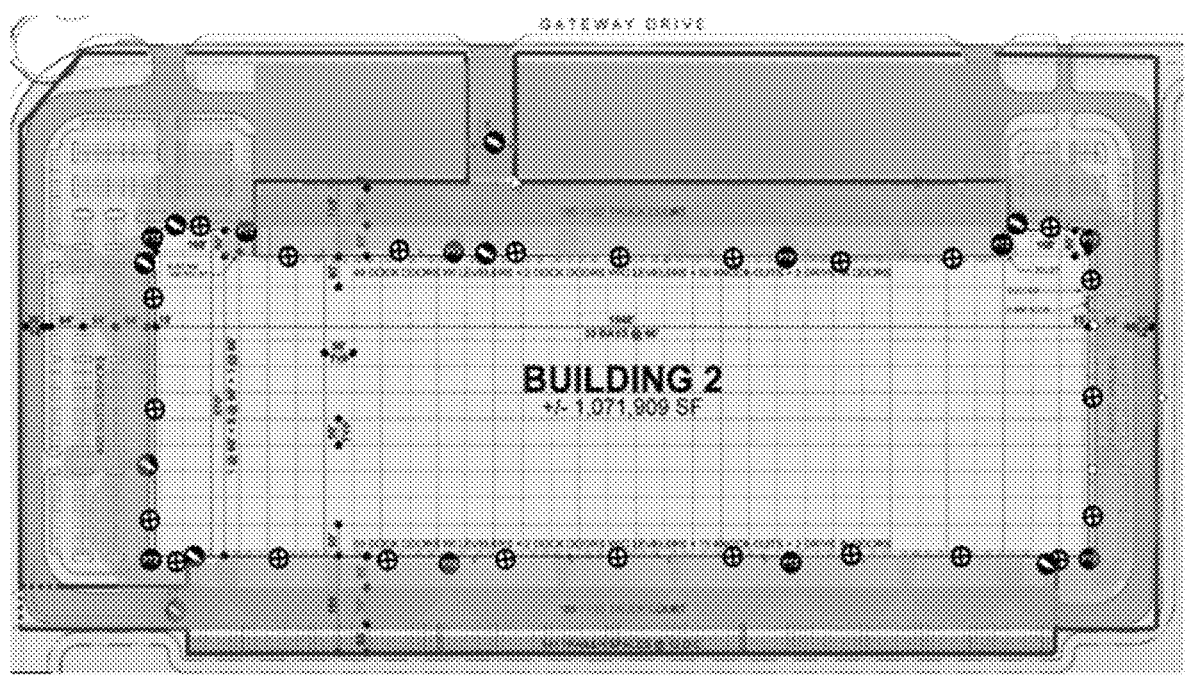
FIG. 3 is a diagram illustrating a CCTV external perimeter of a facility.

FIG. 3 is a diagram illustrating a CCTV external perimeter of a facility. According to FIG. 3, a building is shown that is monitored by a plurality of closed-captioned television (CCTV) security cameras. FIG. 3 identifies other areas of a typical site with security cameras which could be operated on with additional analytics specific to a logistics transportation use-case.

Figure 4:
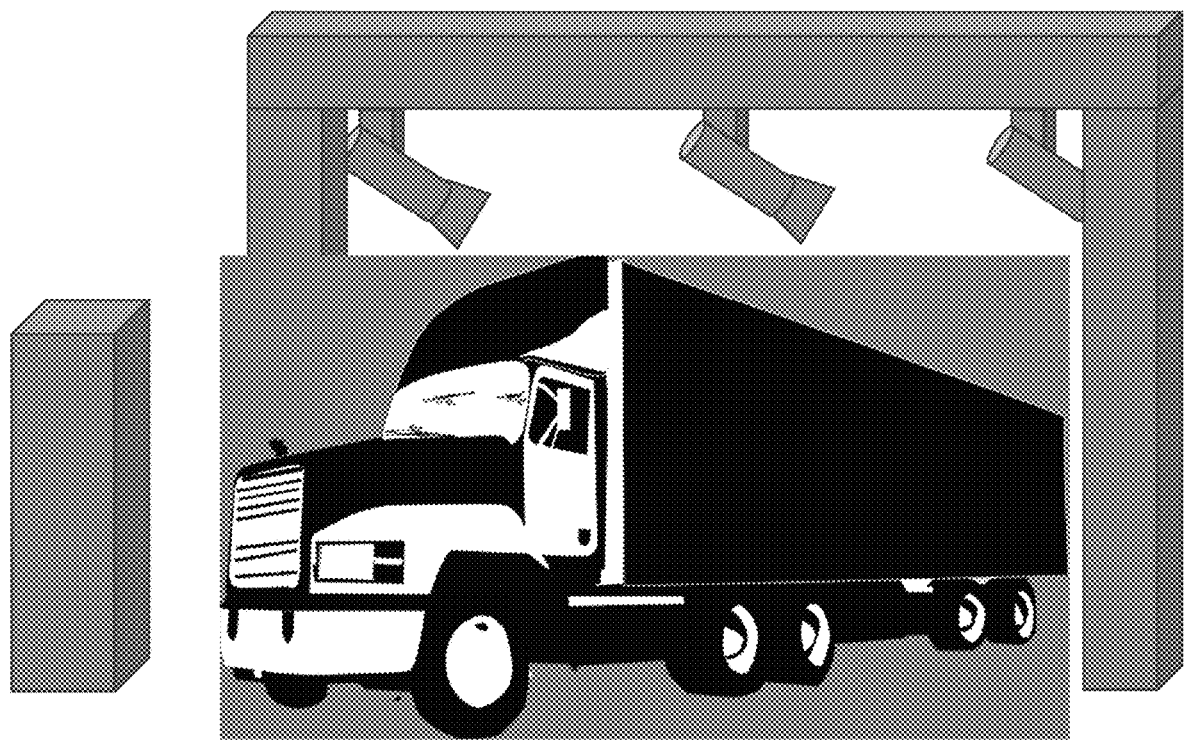
FIG. 4 is a diagram illustrating a proposed truck entry solution (option 1).

FIG. 4 is a diagram illustrating a proposed truck entry solution (option 1). According to FIG. 4, a proposed truck entry solution consists of remote entry gateway configured with a plurality of sensors and cameras as seen in FIG. 2. A remote kiosk tower with a touch display, keyboard, cameras, and sensors is placed in proximity to the remote entry gateway to enable the truck driver to input info and provide authentication credentials (e.g., driver's license, security pass, etc.).

Figure 5:
FIG. 5 is a diagram illustrating a further example of typical locations for department of transportation truck identification on the vehicle (option 2).
Figure 6:
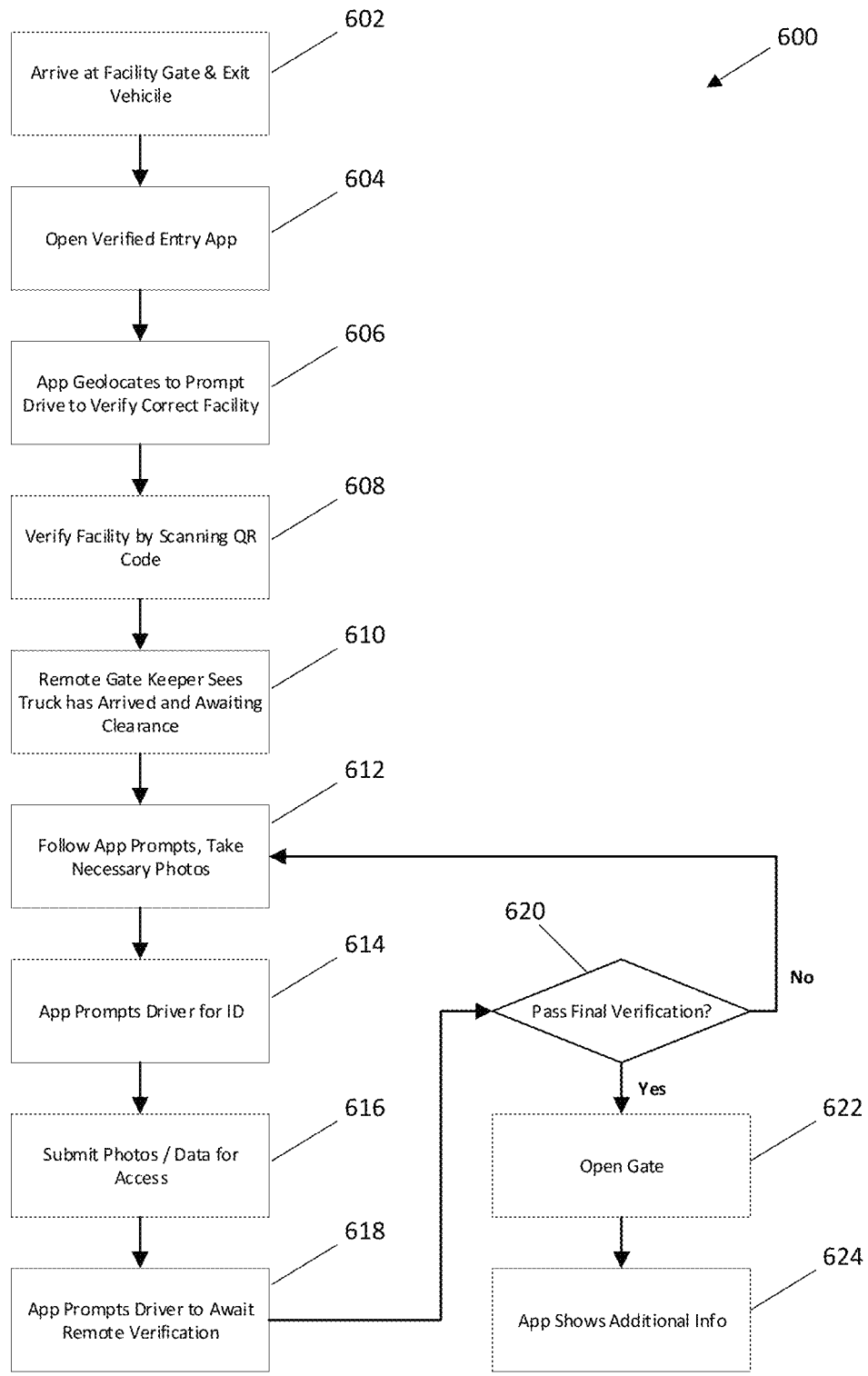
FIG. 6 is a diagram illustrating an exemplary workflow.

According to FIG. 4, a check in process may include the following steps:
- Truck drives up through the gantry
- Driver presses the Wally call button located behind the gantry
- System scanned for license plate, truck, and trailer Department of Transportation (DOT) Number
- System camera tries to detect seal#
- Wally starts interaction with the driver
- Wally shows a specific QR code and asks the driver to scan it with Smart phone camera
- QR code opens a Web App page and asks the driver to add information
  - Name of the main driver
  - Picture of the driver driver's license
  - Picture of the transportation documents (every page)
  - If seal number couldn't be detected by gateway system—clear picture of the seal on back of the truck
- Remote gate controller gets notified when all the information is completed and, in the system
- System automatically assigns a drop/pickup box location with keycode that gets send to the web app
- Gate opens and driver drives in to drop/pickup trailer
- Deposition/pick up of papers at the box
- Driver leaves compound
- Gateway checks truck# and/or trailer# and logs in checkout time FIG. 5 is a diagram illustrating a further example of typical locations for department of transportation truck identification on the vehicle (option 2). According to FIG. 5, a proposed truck entry solution as seen in FIG. 4 may also be used a further solution (option 2). According to FIG. 5, the check in process comprises the steps of:
- Truck drives up to the gate
- Driver scans QR displayed at the gate
- QR code opens a Web App page and asks the driver to add information:
  - Name of the main driver
  - Picture of the driver driver's license
  - Picture of the transportation documents (every page)
  - Take picture of tractor/trailer#→Al scans DOT# into App
  - If seal number couldn't be detected by gateway system—clear picture of the seal on back of the truck
- Remote gate controller gets notified when all the information is completed and, in the system
- System automatically assigns a drop/pickup box location with keycode that gets send to the web app
- Gate opens and driver drives in to drop/pickup trailer
- Deposition/pick up of papers at the box→communication over Web App
- Driver leaves compound and surveillance cameras & gate log the checkout time FIG. 6 is a diagram illustrating an exemplary workflow. FIGS. 7A to 7G are screenshots illustrating the different steps of the exemplary workflow. According to FIG. 6, workflow 600 for facility entry verification starts with a driver arriving at the facility gate and exits the vehicle at step 602. The driver opens the verified entry application at step 604 on his smartphone. The application geolocates and prompts the driver to verify the correct facility at step 606. This is further illustrated in FIG. 7A with a geolocation screenshot illustrating a "Drop-off Facility Found".

Figure 7A:
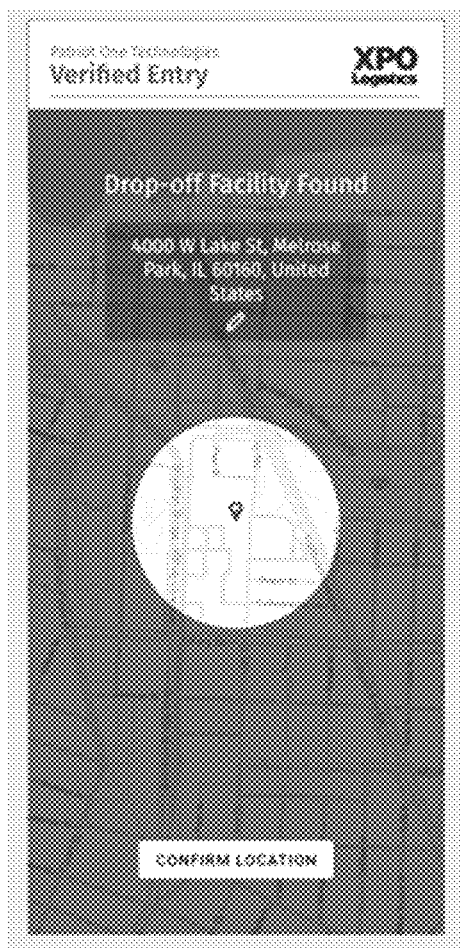
FIGS. 7A to 7G are screenshots illustrating the different steps of the exemplary workflow.
Figure 7B:
Figure 7C:
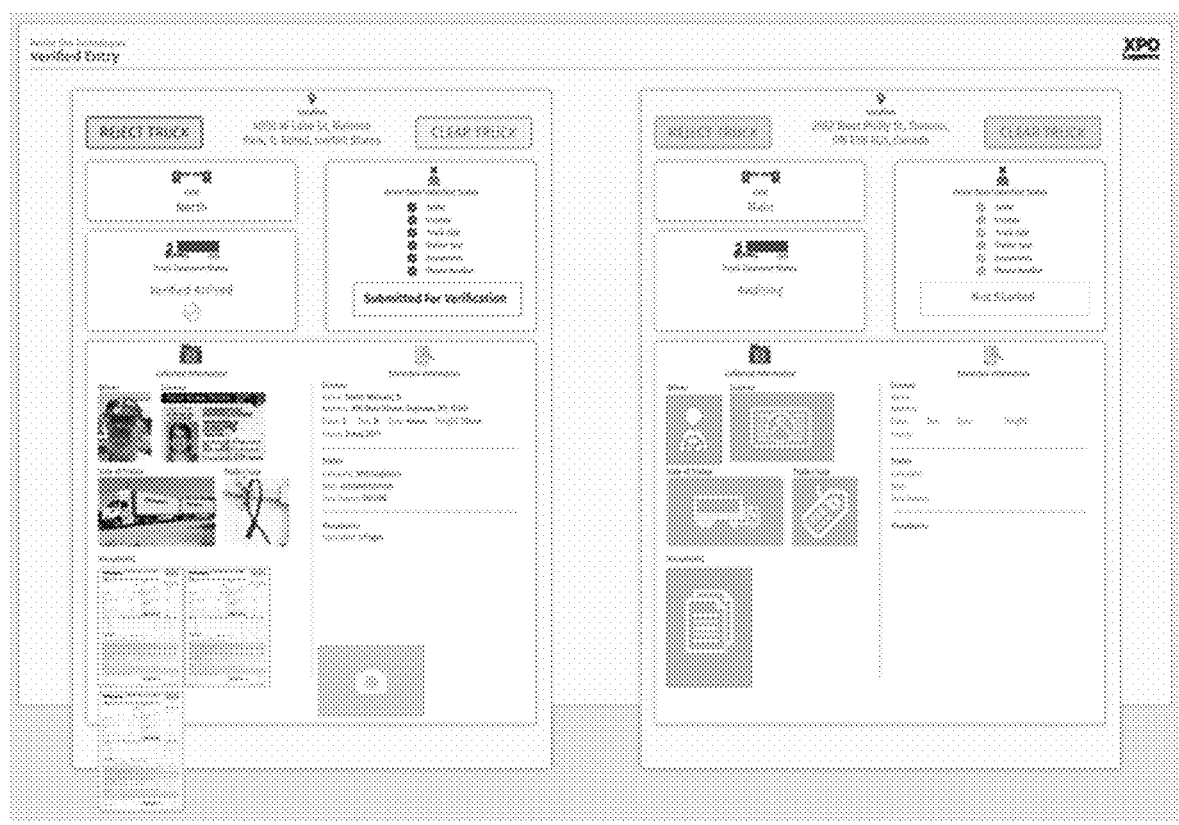

According to FIG. 6, the next step is for the driver to verify the facility by scanning the QR code at step 608. This is further shown in FIG. 7B which shows scanning a QR code and location verified based on the QR code. The remote gate keeper (e.g., security officer, administrator at headquarters, etc.) sees that the truck has arrived and awaits clearance at step 610. A screenshot of an exemplary gatekeeper console is shown in FIG. 7C.

Figure 7D:
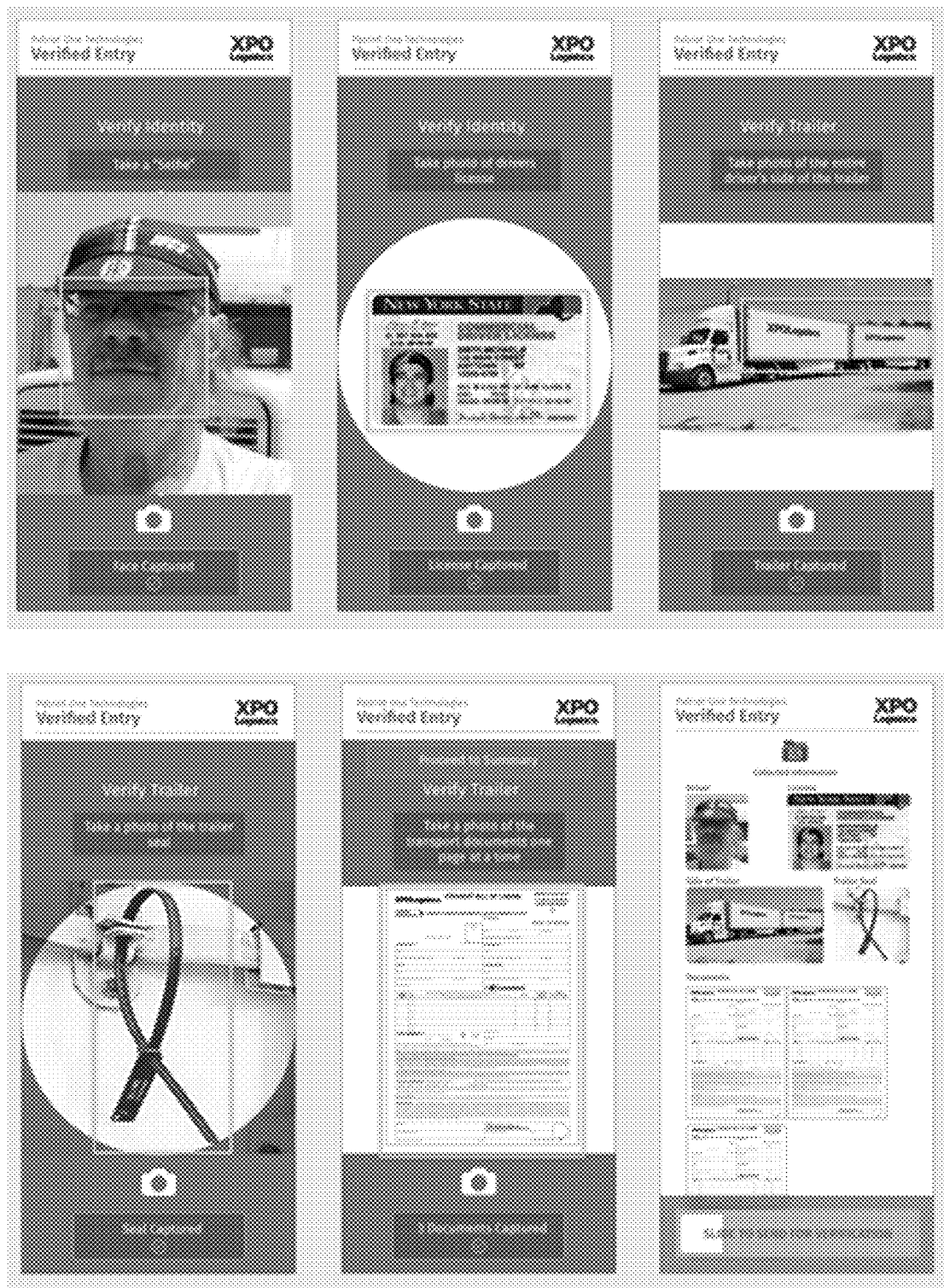
Figure 7E:
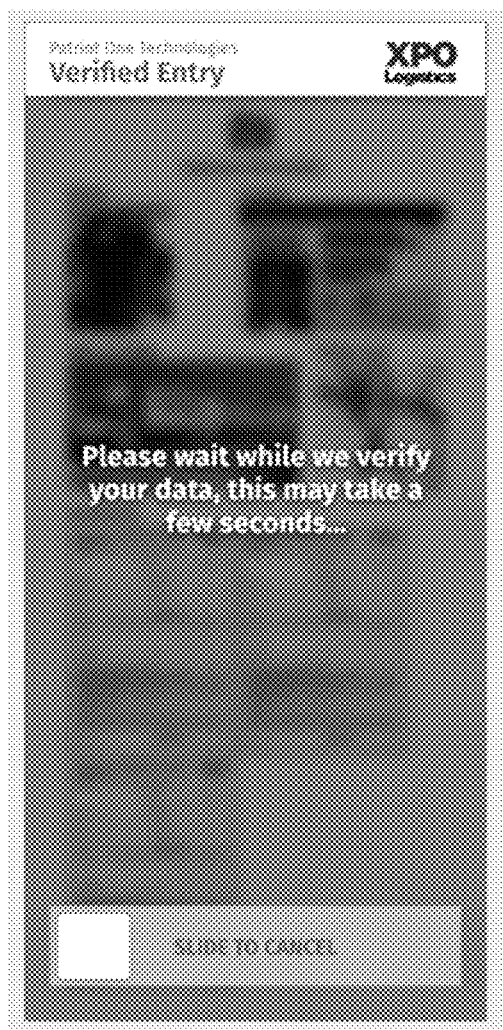
Figure 7F:
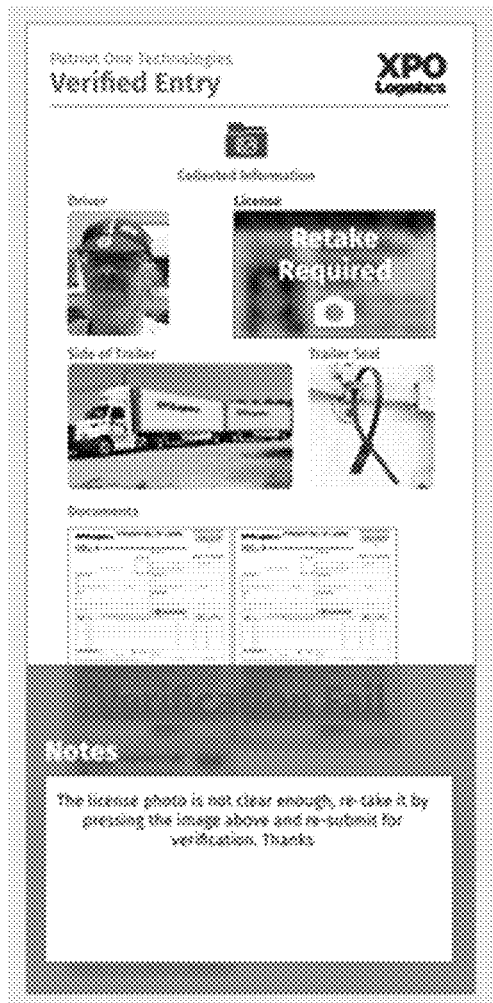

According to the FIG. 6, the driver is than prompted to follow the application to take necessary photos at step 612. The application also prompts driver for identification at step 614. Proper identification may include photo of driver, photo of license, photo of side of truck, photo of transport documents, driver license number, seal number and status, company ID and phone number. Exemplary screenshots of identification is shown in FIG. 7D.

According to the FIG. 6, the driver will then submit necessary photos or data for access at step 616. The application on the mobile device will prompt the driver to wait for remote verification at step 618. An exemplary screenshot that illustrates this can be seen in FIG. 7E.

According to the FIG. 6, the system will then determine the status of final verification at step 620. If verification fails, the process will return to step 612 where the application will prompt the driver to take further photos at step 612. An exemplary verification fail screenshot can be seen in FIG. 7F.

Figure 7G:
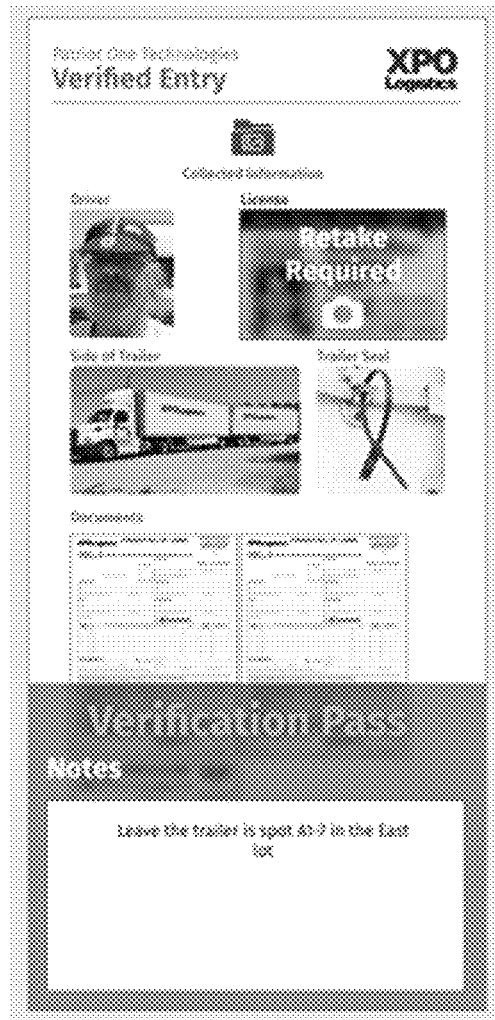

According to FIG. 6, if the system passes final verification at step 620, the gate opens at step 622 and an exemplary verification pass screenshot is shown at FIG. 7G. Finally, the application will display additional information at step 624.

According to further embodiments, an artificial intelligence (AI) system may be developed for the gantry to detect Department of Transportation Number (DOT#) and feed them as machine-readable text into the remote entry system. The Al system may also detect seal# and feed them as machine-readable text into the remote entry system.

According to further embodiments, a web application may be developed that interacts with the driver and adds information into the remote entry system.

According to embodiments of the disclosure, a threat detection system for automated logistical vehicle registration and validation for remote monitoring of a vehicle is disclosed. The threat detection system comprises a computer processor, a communications channel to receive signals from a mobile device, a threat detection platform, a plurality of sensors deployed at the gate of a logistics facility configured to capture and record detail information of the vehicle, a data center hosting the automated logistical vehicle registration and validation system, an artificial intelligence (AI) module on the threat detection system to process information.

According to the disclosure, the sensors of the threat detection system capture detail info of the vehicle and confirms the detail with the driver of the vehicle and the data is processed and verified by the Al module of the threat detection system and provide an entry verification for the vehicle to the facility. The sensors are selected from a list consisting of an optical camera, an infrared camera and a thermal camera.

According to the disclosure, the detail info of the threat detection system further comprises information relating to license plate, vehicle identification number (VIN), driver's license and driver company ID. The vehicle and driver identification credentials can be provided by a mobile application of the driver. The mobile application communicates with data center and threat detection system is configured to take photos for verification. The threat detection system further comprises creating actionable alerts to be sent to the driver mobile device and security personnel.

According to further embodiments of the disclosure, a computer-implemented method for automated logistical vehicle registration and verification with a threat detection system of a vehicle is disclosed. The method comprises the steps of receiving a notice that the vehicle has arrived at a gate of a logistics facility, opening a verified entry application on the driver mobile device, geolocating to the correct facility by the verified entry application, verifying the facility by scanning QR code, receiving data at data center of the threat detection system, prompting the driver on the verified entry application for identification, receiving identification from driver at the data center of the threat detection system, sending verification data to data center of the threat detection system, confirming approval of final verification by the threat detection system, opening the facility gate if final verification is successful and prompting the driver for additional info if final verification fails.

According to method of the disclosure, the mobile device is a smartphone. The verified entry application is a mobile application on smartphone that communicates with data center of the threat detection system and configured to take photos for verification. The dentification is selected form a list consisting of photo of driver, photo of license, photo of side of truck, photo of transport documents, driver license number, seal number and status, company ID and phone number.

According to method of the disclosure, the method further comprising the step of providing additional detail info relating to license plate, vehicle identification number (VIN), driver's license and driver company ID. The method further comprising creating actionable alerts at the threat detection system to be sent to the driver mobile device and security personnel. The actionable alert includes sending a recommendation to the security personnel to approve entry of the vehicle.

According to method of the disclosure, the method further comprises showing additional information on the verified entry application of the mobile device. The method further comprises running an artificial intelligence (AI) module on the threat detection system to process verification for entry of the vehicle.

Implementations disclosed herein provide systems, methods and apparatus for generating or augmenting training data sets for machine learning training. The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed is:

1. A threat detection system for automated logistical vehicle registration and validation for remote monitoring of a vehicle, comprising:
    a computer processor;
    a communications channel to receive signals from a mobile device;

a threat detection platform;

a plurality of sensors deployed at a gate of a logistics facility configured to capture and record detail information of the vehicle;

a data center hosting the automated logistical vehicle registration and validation system;

an artificial intelligence (AI) module on the threat detection system to process information; and a verified entry mobile application on a smartphone of the driver configured to communicate with the data center of the threat detection system and configured to take photos of the driver for verification;

wherein the plurality of sensors captures detail info of the vehicle and detail info of the driver and confirms the detail data with the driver of the vehicle;

wherein the mobile application geolocates the location of the logistics facility and prompts the driver to verify the correct facility;

wherein the vehicle and driver data is processed and verified by the AI module of the threat detection system and provide an entry verification for the vehicle to the facility;

wherein the plurality of sensors comprises a driver camera, a tractor license plate camera and a tractor trailer camera.

2. The system of claim 1 wherein the plurality of sensors is selected from a list consisting of an optical camera, an infrared camera and a thermal camera.

3. The system of claim 1 where the detail info further comprises information relating to license plate, vehicle identification number (VIN), driver's license and driver company ID.

4. The system of claim 1 wherein the vehicle and driver identification credentials is provided by the mobile application of the driver.

5. The system of claim 1 further comprising creating actionable alerts at the threat detection system to be sent to the driver mobile device and security personnel.

6. A computer-implemented method for automated logistical vehicle registration and verification with a threat detection system of a vehicle, comprising a plurality of sensors deployed at a gate of a logistics facility configured to capture and record detail information of the vehicle, the method comprising the steps of:

receiving a notice that the vehicle has arrived at a gate of a logistics facility;

opening a verified entry application on the driver mobile device;

geolocating to the correct facility by the verified entry application;

verifying the facility by scanning QR code;

receiving data at data center of the threat detection system;

prompting the driver on the verified entry application for identification;

receiving identification from driver at the data center of the threat detection system;

sending verification data to the data center of the threat detection system;

confirming approval of final verification by the threat detection system;

opening the facility gate if final verification is successful;

prompting the driver for additional info if final verification fails; and running an artificial intelligence (AI) module on the threat detection system to process verification for entry of the vehicle;

wherein the verified entry application is a mobile application on the mobile device that communicates with the data center of the threat detection system and is configured to take photos of the driver for verification;

wherein the plurality of sensors comprises a driver camera, a tractor license plate camera and a tractor trailer camera.

7. The method of claim 6 wherein the driver mobile device is a smartphone.

8. The method of claim 6 wherein the identification is selected form a list consisting of photo of driver, photo of license, photo of side of truck, photo of transport documents, driver license number, seal number and status, company ID and phone number.

9. The method of claim 6 further comprising the step of providing additional detail info.

10. The method of claim 9 wherein additional detail info comprises information relating to license plate, vehicle identification number (VIN), driver's license and driver company ID.

11. The method of claim 6 further comprising creating actionable alerts at the threat detection system to be sent to the driver mobile device and security personnel.

12. The method of claim 11 where the actionable alert further comprises sending a recommendation to the security personnel to approve entry of the vehicle.

13. The method of claim 6 further comprising step of showing additional information on the verified entry application of the mobile device.

\* \* \* \* \*